June 16, 1931.   D. I. REITER   1,810,576
SNAP FASTENER ELEMENT
Filed Aug. 14, 1930
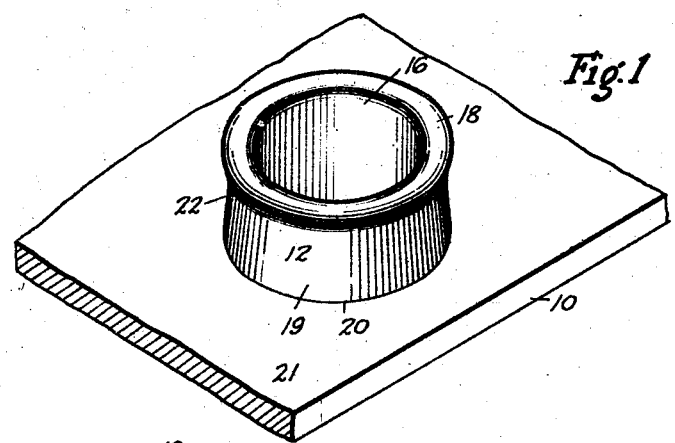
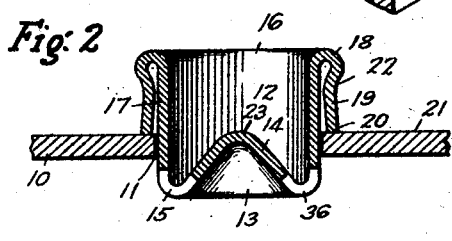
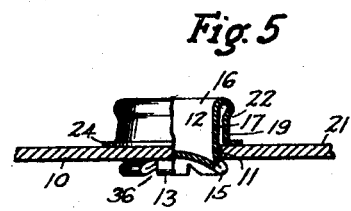
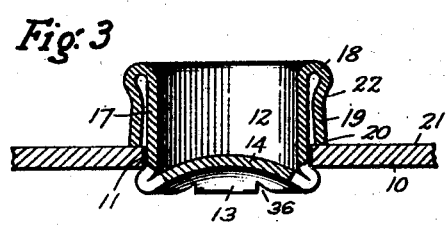
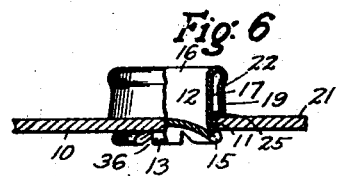
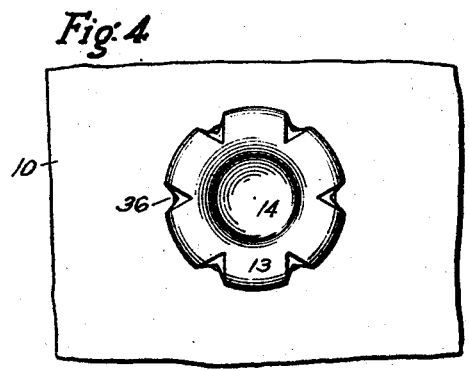
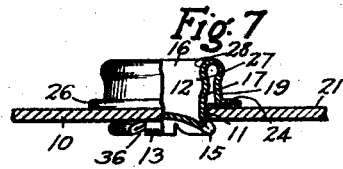
INVENTOR
Daniel I. Reiter
BY
*Harry Jacobson*
ATTORNEY Patented June 16, 1931

1,810,576

UNITED STATES PATENT OFFICE

DANIEL I. REITER, OF NEW YORK, N. Y.

SNAP FASTENER ELEMENT

Application filed August 14, 1930. Serial No. 475,170.

This invention relates to fasteners and particularly, to one of the elements of a snap fastener which is adapted to be readily secured in place in and to the wall of an aperture in a rigid support. Ordinarily, the support would be the windshield frame or sheet metal body of an automobile.

My invention contemplates, among other things, the provision of such a fastener element, which may be readily designed for use either as a stud or as a socket.

My invention further contemplates the provision of a simple, one-piece snap fastener element, designed for economical quantity production, which may be passed or snapped through an aperture, and part of which may then be distorted to expand the part inserted through the aperture to fix the element to the wall of the aperture, as by means of a tool inserted through the open end of the element. Such snap fastener elements are particularly useful in connection with sheet metal parts of automobiles in which holes may be stamped for the reception of such elements, and where access to the inserted part of the fastener element cannot be had after said part has been passed through the aperture.

My invention further contemplates the provision of such a fastener in which the inserted portion is of maximum diameter to increase the efficacy of the securing operation as compared to the diameter of the fastener engaging part, and in which wide flanges may be dispensed with. The various objects of my invention will be clear from the description which follows, and from the drawings, in which, Fig. 1 is a perspective view of the exposed or visible fastener engaging part of my improved fastener element, the support being shown broken away.

Fig. 2 is a vertical section of the same, the fastener element being shown of its normal diameter and shape prior to the distortion of the inserted end, and prior to the fixation thereof to its support.

Fig. 3 is a similar view of the same as it may appear after the inserted end of the element has been expanded and the distortable part distorted to fix the element to the support.

Fig. 4 is a bottom plan view of the element shown in Fig. 3 as it appears after fixation to the support, the expansion of the inserted end being indicated by the spreading of the slots or slits.

Fig. 5 is a vertical section and partial elevation of a modified form of my improved fastener element showing an outwardly extending terminal flange thereon.

Fig. 6 is a similar view of another modified form of the same wherein the terminal flange is shown extending inwardly from the stud portion of the element, and Fig. 7 is a similar view of another modified form of the same, showing the terminal exposed fastener engaging portion so shaped that it may be used either as a socket or as a stud.

In that practical embodiment of my invention which I have illustrated by way of example, the comparatively rigid support as 10 may be the sheet metal body or the metal frame of an automobile or any other suitable and comparatively thin and rigid member to which the element 12 is to be fixed. The aperture 11 in the support 10 is made of sufficient diameter to permit the expansible portion 13 at one end of the element 12 to pass readily therethrough. The element 12 is preferably made of a single piece of sheet metal. At one end, which is to be inserted through the aperture 11, and which I have referred to as the "inserted end", a depression or reentrant hump as 14 is provided, extending from the preferably slotted rim 15 toward the open end 16. A series of suitable slots or slits 36 are made in the rim 15 and extend partly into the hump 14 and partly into the side wall or tubular portion 17. Said portion 17 may be of uniform diameter throughout, slightly less than the diameter of the aperture 11, or the end of the portion 17 may be slightly enlarged so that it may snap through the aperture, in a manner which is well understood.

At its exposed or projecting end, the material extending from the tubular portion 17 is bent back upon itself, and outwardly of and preferably in spaced relation to the wall 17, to provide a fold or rim as 18 subtending an angle of approximately 180°, and an outer tubular wall 19 concentric with the tubular portion 17. The length of the wall 19 is less than that of the portion 17, whereby the terminal end or edge 20 of the wall 19 may engage the exposed or visible surface 21 of the support 10, and thereby limit the passage of the element 12 through the aperture 11, all as is clearly shown in Fig. 2. The rim 18 is suitably shaped, as will be further explained, to enable said rim together with the walls 17 and 19 to act either as a stud or as a socket or both, as may be desired.

As is illustrated in Figs. 1, 2, 3, 5 and 6, the wall 19 is provided with a suitable indent or curved groove 22 of less diameter than the outermost diameter of the rim 18 so that said rim may act as a stud. Since the wall 19 is spaced from the tubular portion 17, the rim 18 may be used in connection with either a resilient or a rigid socket. When used with a rigid socket, the wall 19 may contract toward the tubular portion 17 as the rim 18 is forced into the socket. When used with a resilient socket, the rim 18 is sufficiently stiff to serve as a suitable stud, and the socket may have less resistance and be more yieldable than the rim, so that the socket may yield instead of the wall 19. Since both resilient and rigid sockets are well known in the art, such sockets need not be here shown nor described in detail.

After the element 12 has been inserted through the aperture 11, the hump 14 may be forced away from the opening 16 and consequently distorted in a well known manner, thereby increasing the diameter of the rim 15 to such an extent that the diameter of said rim becomes greater than that of the aperture 11, and the rim or that end of the tubular portion 17 is forced into pressed contact with the wall of the aperture. The hump 14 thereby assumes a flattened or distorted shape as shown approximately in Fig. 3.

The forcing operation just described may be performed by any suitable tool such as a rod, of the proper diameter to enter the opening 16 and to contact with the face 23 of the hump 14. The end of the tool may, of course, be shaped to correspond either to the original shape of the hump 14 or to its final shape, as may be found convenient or desirable, and in a manner which will be obvious to those skilled in the art and hence which need not be further described.

As illustrated in Fig. 5, the wall 19 terminates in a flange 24 extending outwardly from the free end of said wall and adapted to contact and rest against the surface 21 of the support 10. While the flange 24 increases the area of contact between the free terminal edge of the wall 19 and the support, and therefore has certain advantages, it will be understood that said flange may be dispensed with, if desired, without detracting from the efficacy of my invention, as shown in the preferred forms in Figs. 2 and 3.

As illustrated in Fig. 6, the flange may be bent inwardly or toward the tubular portion 17, if desired, to provide the flange portion 25 having the same function and effect as the flange 24 but presenting a somewhat better appearance in that the flange is concealed.

As illustrated in Fig. 7, the edge 26 of the flange 24 may be turned back upon itself to present a finished edge. The element 12 of the modified form illustrated in this figure, as well as the corresponding element of the other figures, may also be provided with a depression, indent, bead or groove 27 arranged just below the rim 18, and coacting with the tubular portion 17 so as to form a slight curved projection 28 near the opening 16. Said projection 28 in connection with the indent 27 causes the rim 18 to serve as a socket as well as a stud. That is, a resilient head stud or even certain types of rigid studs may be inserted into the opening 16 and held in separable snapping engagement with the exposed rim 18 of the element 12 in a manner well known in the art, so that said element may be used interchangeably as a stud or as a socket, if desired, in connection with a suitable cooperating snap fastener.

It will be seen that I have provided a simple and efficient one-piece snap fastener element which is adapted to be inserted through the aperture of a rigid support and readily fixed thereto by means of a suitable tool, and which is provided with means in the form of a free edged wall for limiting the passage of the inserted portion of the element through the aperture.

It will further be seen that my improved element may be used either as a socket or as a stud, that it is well adapted for economical manufacture in large quantities and to meet the severe requirements of practical use.

While I have shown and described certain preferred embodiments of my invention, I do not wish to be understood as intending to limit myself thereto, but I intend to claim my invention as broadly as may be permitted by the state of the prior art and the terms of the appended claims.

I claim:

1. In combination, a rigid sheet metal support having an aperture therethrough, and a one-piece open stud fixed to the support at the aperture and comprising a tubular inner portion open at one end, and of uniform diameter throughout the length thereof prior to its fixation to the support, a reentrant distortable hump at the other end of said tubular portion for increasing the diameter of said other end to a size greater than the diameter of the aperture through which said portion is inserted, on movement of the hump toward said other end, to fix the element to the support after said portion has been passed through the aperture, and a substantially cylindrical continuous outer wall bent from the open end of said tubular portion toward the hump and into substantially concentric parallel relation to and outside of the tubular portion, said wall being of less length than said tubular portion and engaging the face of said support, the juncture of said wall and tubular portion and that of said wall adjacent the juncture being shaped to provide the socket engaging portion of said stud.

2. A cylindrical one-piece snap fastener stud element comprising a tubular portion open at one end, a reentrant hump at the other end of said portion adapted to be distorted to expand said other end, and a continuous wall bent from the open end of said tubular portion and substantially concentric therewith and of less length than said tubular portion, part of said wall at the juncture of said wall and said portion being shaped to provide a terminal stud head on said snap fastener stud element.

3. In a snap fastener element, a continuous outer wall, a continuous inner wall open at one end and substantially concentric with and joined to the outer wall, said outer wall terminating at a point intermediate the ends of the inner wall, and said inner wall being of less diameter throughout its entire length than the least diameter of the outer wall, a reentrant, slitted hump substantially closing the other end of said inner wall and joined thereto, said hump being expandible to enlarge said other end of the inner wall by means of a tool inserted through the open end of said inner wall, and a continuous rim at the juncture of said walls shaped and recessed for snapping engagement with and disengagement from a cooperating snap fastener stud or socket.

4. In a snap fastener element made of a single piece of sheet material, a continuous cylindrical outer wall, a longer continuous cylindrical inner wall joined at one end to the outer wall and arranged coaxially thereof and parallel thereto, and a slotted reentrant expansible portion at the other end of the inner wall, the outer wall terminating at a point between the ends of the inner wall.

5. In a one piece fastener element, a continuous cylindrical member serving as a stud and having a free terminal portion limiting the distance through which the element may be passed through an aperture in a rigid support, a second continuous cylindrical member of uniform diameter throughout its length joined at its upper end to the upper end of the first-mentioned member and arranged interiorly thereof, the lower portion of said second member being adapted to pass through the aperture, and a distortable reentrant partly slitted hump at the lower end of said second member, the stud portion of the first-mentioned member being arranged at the juncture of said members whereby the upper portions of both of said members are adapted to be snapped into a socket.

6. A one-piece partly distortable combined stud and socket element adapted to be fixed to a rigid support at an aperture thereof after the partial passage of the element through said aperture, comprising a pair of substantially concentric walls, the inner of said walls being of greater length than the outer wall, a continuous rim joining one end of each of said walls, the inner part of said rim being shaped for snap engagement with a stud and the outer part of said rim being shaped for snap engagement with a socket, said outer wall having a free end terminating at a point between the ends of the inner wall, and a reentrant distortable and expandible hump arranged across the end of the inner wall opposite the rim and substantially closing said end, said inner wall being otherwise open throughout its length for the reception of a tool insertable thereinto to press upon the hump and to expand the hump and the adjacent end of the inner wall to fix the element to said support.

7. In a fastener element, an outer wall having a free terminal portion at one end adapted to engage the exposed face of a rigid support for preventing the passage of the element completely through an aperture in said support, a rim portion at the other end of said wall adapted for cooperative engagement with a stud or socket element, a cylindrical inner wall depending from said rim and of greater length than the outer wall but of less diameter, and a reentrant terminal portion connected to the inner wall and adapted to be distorted to increase the diameter of that part of the inner wall which has been passed through the aperture, said walls, said rim and said reentrant portion being formed of a single piece of material.

8. In a fastener element, an open and double-walled fastener member, the inner wall being continuous and in the form of a cylinder of uniform diameter and of greater length than the outer wall and a distortable reentrant portion at the end of the inner wall opposite to the open end, the outer wall being continuous and cylindrical in form and having a free end arranged at a point intermediate the ends of the inner wall, and having a socket engaging portion at its other end joined to the open end of the inner wall.

9. In a one-piece fastener element, an axially elongated continuous portion arranged coaxially of the element, and serving to limit the passage of the element through an aperture of less diameter than that of said portion, a second portion of cylindrical form depending from the upper extremity of the first-mentioned portion and being joined thereto to form a stud engaging rim therewith, and arranged interiorly thereof, and a reentrant distortable portion at one end of the second portion.

10. A fastener element adapted to serve as a socket or as a stud, and formed of a single piece of material comprising a fastener member having an open annular continuous rim at one end for engagement with a cooperating snap fastener element and a pair of substantially concentric cylindrical walls depending from and joined at one end to the rim, the inner of said walls being of greater length than the outer wall and a reentrant, distortable portion substantially closing the other end of the inner wall and expandible to increase the diameter of said inner wall, said walls being coextensive through part of the length of the element.

11. In a fastener element, a pair of substantially concentric tubular continuous cylindrical walls, the inner wall being longer than the outer wall and said walls being co-extensive throughout the length of the outer wall, a rim joining adjacent ends of said walls and serving as a stud head, and a reentrant portion connected to the inner wall for expanding the end portion of said wall opposite to the rim.

12. In a fastener element, a pair of substantially concentric tubular continuous cylindrical portions bent from a single piece of material, a bend sub-tending an angle of approximately 180° joining said portions and serving as a stud head, and means on the inner of said portions, assembled within the inner portion and forming part thereof for expanding one end of the inner portion.

13. In a fastener element formed of a single piece of sheet material, a pair of concentric substantially cylindrical tubular portions each of substantially uniform diameter, the outer portion being integral with, and joined at one end to, and of less length than, the inner portion to form a stud head at the juncture of said portions, and the inner portion terminating opposite the stud head, in a member distortable by movement away from the stud head to fix the element to a support.

14. In a fastener element, a pair of substantially concentric tubular cylindrical, continuous walls arranged coaxially of the element and formed of a single piece of sheet material, the outer wall being bent outwardly of the inner wall through an angle of 180° and being of less length than said inner wall, a flange at the free end of the outer wall, and a reentrant hump connected to the inner wall.

15. In a fastener element, a pair of substantially concentric cylindrical, continuous, tubular walls arranged coaxially of the element and formed of a single piece of sheet material, a rim sub-tending an angle of approximately 180°, joining said walls and terminating in depressions whereby said rim may serve as a stud or as a socket and a flange extending from the free end of the outer wall in a plane at substantially right angles to the axis of the element.

16. In a fastener installation, a rigid support having an aperture therein, a fastener element comprising a continuous tubular upright cylindrical portion arranged coaxially of the element and adapted to pass partly through the aperture, said inner portion having a distortable reentrant hump at one end thereof to fix the element to the walls of the aperture after said portion has been passed through said aperture and said inner portion being normally of slightly less diameter than that of said aperture, an outer tubular, continuous, upright portion of less length than the inner portion and terminating at a point intermediate of the ends of said inner portion, a rim sub-tending an angle of approximately 180° joining the adjacent ends of said portions and terminating in an indent to shape the rim in the form of a fastener element, the free end of the outer portion being adapted to engage the surface of the rigid support to prevent the passage of the element completely through the support.

17. In a fastener installation, a rigid support having an aperture therein, a fastener element comprising an outer imperforate, unslotted, continuous wall of greater inner and outer diameter than that of said aperture, an inner wall of slightly less diameter than that of said aperture, said walls being formed of a single piece of sheet material and joined at their upper ends, said upper ends being shaped to provide an unslotted fastener member, and a distortable reentrant portion at the lower end of the inner wall adapted to spread said lower end to increase the diameter of said lower end to an extent greater than the diameter of the aperture to fix the element to the support.

DANIEL I. REITER.